United States Patent
Josephson et al.

(10) Patent No.: US 6,804,793 B2
(45) Date of Patent: Oct. 12, 2004

(54) MANIPULATING AN INTEGRATED CIRCUIT CLOCK IN RESPONSE TO EARLY DETECTION OF AN OPERATION KNOWN TO TRIGGER AN INTERNAL DISTURBANCE

(75) Inventors: Don D Josephson, Ft Collins, CO (US); Samuel D. Naffziger, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 09/811,256

(22) Filed: Mar. 16, 2001

(65) Prior Publication Data

US 2002/0130695 A1 Sep. 19, 2002

(51) Int. Cl.$^7$ ................................................ G06F 1/04
(52) U.S. Cl. ......................... 713/501; 714/47; 327/175
(58) Field of Search ........................ 713/501; 327/175; 714/47

(56) References Cited

U.S. PATENT DOCUMENTS

| | | | |
|---|---|---|---|
| 5,336,939 A | * | 8/1994 | Eitrheim et al. ............ 327/291 |
| 5,867,644 A | | 2/1999 | Ranson et al. |
| 5,880,671 A | | 3/1999 | Ranson et al. |
| 5,948,106 A | * | 9/1999 | Hetherington et al. ...... 713/501 |
| 5,956,289 A | * | 9/1999 | Norman et al. ............. 365/233 |
| 6,586,971 B1 | * | 7/2003 | Naffziger et al. ............. 327/41 |

* cited by examiner

Primary Examiner—Thomas Lee
Assistant Examiner—Albert Wang

(57) ABSTRACT

A system and method are disclosed which provide an integrated circuit having a clock signal that is dynamically manipulated in response to detected events within the integrated circuit. In one embodiment, the chip includes event detection circuitry that monitors the operation of the chip and detects events that lead to a power disturbance therein. Circuitry may be included for detecting anticipated operation known to trigger an event, as well as for detecting unanticipated events. Additionally, clock manipulator circuitry is included to manipulate the chip's clock signal responsive detection of an event to enable the chip to cope with such event. In response to an event being detected, the clock manipulator circuitry may dynamically manipulate the clock signal in various manners, such as by altering the clock signal's duty cycle, delaying the occurrence of a transition of the clock signal, or altering the clock signal's frequency, as examples.

23 Claims, 3 Drawing Sheets

MANIPULATING AN INTEGRATED CIRCUIT CLOCK IN RESPONSE TO EARLY DETECTION OF AN OPERATION KNOWN TO TRIGGER AN INTERNAL DISTURBANCE

TECHNICAL FIELD

The present invention relates generally to integrated circuits, such as microprocessors, and more particularly to a system and method for optimizing performance of integrated circuits by dynamically manipulating the clock of such integrated circuits to account for events such as power disturbances, therein.

BACKGROUND

Typically, an integrated circuit (or "chip") utilizes a clock to control the circuits therein. As is well known in the art, chips are commonly designed such that their circuits operate synchronously according to a clock signal. That is, the exact times at which any output of the circuits can change states are determined by a clock signal. The clock signal is generally a rectangular pulse train or square wave signal input to or generated within the chip. While some chips (or portions thereof) may operate asynchronously, such asynchronous components are generally more difficult to design and troubleshoot than are synchronous components. For instance, synchronous components are generally easier to troubleshoot because the circuit outputs can change only at specific instants of time. In other words, such components of the chip are synchronized to the clock-signal transitions (also known as "clocks") of the chip.

Because operation of the chip's circuits are triggered upon clock-signal transitions, "events" (or "power disturbances") are often encountered upon the occurrence of particular clock-signal transitions. That is, as a chip's circuits operate they draw power, and upon a clock-signal transition occurring many of the circuits may draw additional power to perform the tasks triggered by such clock-signal transition. As a result, clock-signal transitions often result in voltage transients within the chip. Because the operation of the chip's circuits is triggered by clock-signal transitions, much of the circuits' operation is congregated at the clock-signal transitions. Therefore, power disturbances are commonly encountered upon clock-signal transitions. For instance, the power drawn by the circuits may be relatively flat (constant) until the occurrence of a particular clock-signal transition in which many of the circuits are triggered, thereby causing an increase in the power drawn by such circuits.

For example, upon the leading edge of a clock-signal transition, a program counter (e.g., a register) may be incremented. Additionally, at some point the program counter will flip all of its bits (which may, for example, be 256 bits or more) over from all ones to its beginning point of all zeros, which may cause the output of many gates within the chip to change states (e.g., change from an output of 1 to an output of 0). Such operation of many gates being triggered upon the occurrence of the clock-signal transition will typically result in a power disturbance (e.g., a very high voltage transient) within the chip. Of course, many other situations may be encountered in which a clock-signal transition may trigger operation of circuitry within the chip resulting in a power disturbance.

Additionally, certain clock-signal transitions result in higher voltage transients than other clock-signal transitions. For instance, in the above example of a program counter, the clock-signal transition in which all of the program counter's bits change their state results in a much higher voltage transient than a clock-signal transition in which only one or two of the program counter's bits change their state. Of course, the clock-signal transition resulting in the program counter changing the state of all of its bits occurs only on a relatively small percentage of the clock-signal transitions (e.g., only once out of every 65 thousand clock-signal transitions).

Thus, depending on the operations triggered within the chip on each clock-signal transition, certain clock-signal transitions result in a much greater power disturbance than others. As still another example, suppose that on 60 percent of the clock-signal transitions within a chip a 100 millivolt (mV) drop in voltage occurs within the chip, on 30 percent of the clock-signal transitions a 150 mV drop in voltage occurs within the chip, and on 10 percent of the clock-signal transitions, a 200 mV drop in voltage occurs within the chip. Prior art chips are generally implemented to operate at a frequency suitable for the absolute worst case power disturbance that may be encountered to prevent the chip from failing upon the occurrence of such worst case power disturbance. That is, during development of a chip it is typically tested with some code sequence designed to cause the absolute worst case power disturbance in the chip's performance, and from such testing a suitable clock frequency for the chip is determined that enables the chip to operate even upon the occurrence of such worst case power disturbance.

For instance, in the above example, the chip's clock signal would be implemented at a sufficiently low frequency such that the chip does not fail upon the occurrence of a 200 mV drop in voltage. That is, prior art chips are commonly designed having additional voltage margin implemented therein such that the chips are capable of performing even when the chips' operation result in voltage transients within the chips. However, the worst case power disturbance may only be encountered on a very small percentage of the clock-signal transitions (e.g., on only 10 percent of the clock-signal transitions in the above example). Thus, prior art chip designs sacrifice chip performance during those clock-signal transitions that do not trigger such worst case power disturbance (e.g., during 90 percent of the clock-signal transitions in the above example) in order to prevent failure of the chip during the clock-signal transitions that do trigger such worst case power disturbance. Of course, such a sacrifice has been deemed much more desirable in chips of the prior art than an implementation which results in failure of the chip during the worst case power disturbances. Accordingly, performance of prior art chips has been limited by the implementation of a static clock signal set at a frequency sufficiently low to enable the chip to operate during the worst case power disturbances.

SUMMARY OF THE INVENTION

The present invention is directed to a system and method which enable dynamic manipulation of a clock signal within an integrated circuit to enable optimum performance of the integrated circuit. That is, a desire exists for a system and method which enable a clock signal to be manipulated within an integrated circuit to allow for optimum performance of the chip depending on events, such as power disturbances, being (or about to be) encountered by the chip. As used herein, "events" include any situations that result in or lead to a disturbance within the integrated unit. "Disturbance" is intended to be used broadly to encompass any type of disturbance within an integrated circuit, including without limitation power disturbance and operational disturbance (e.g., incorrect performance or failure of the integrated circuit).

The present invention is directed to a system and method which provide an integrated circuit having a clock signal which it can dynamically manipulate in response to detected events. In a preferred embodiment, the integrated circuit includes synchronous circuitry that receives and operates according to a clock signal. The integrated circuit of a preferred embodiment further includes event detection circuitry that is arranged to monitor the operation of the integrated circuit and detect an event therein. Additionally, clock manipulator circuitry is included in the integrated circuit of a preferred embodiment to manipulate the clock signal, responsive to the event detection circuitry detecting an event, to enable the integrated circuit to cope with the detected event without failing.

In response to an event being detected, the clock manipulator circuitry may be implemented to manipulate the clock signal in various manners, such as by altering the duty cycle of the clock signal, delaying the occurrence of a transition of the clock signal, or altering the frequency of the clock signal, as examples. The event detection circuitry of a preferred embodiment may further detect the end of an event, and may notify the clock manipulator circuitry to manipulate the clock signal to the optimum clock signal for normal operation of the integrated circuit. In one embodiment, the event detection circuitry includes trigger circuitry operable to detect an anticipated operation of the integrated circuit known to trigger an event that leads to a disturbance, such as a power disturbance, within the integrated circuit. For example, the trigger circuitry may monitor the operation of the chip for particular data (or sequences of data), commands, addresses, control signals and/or instructions, as examples, which are known to commonly trigger disturbances, such as power disturbances, within the chip. For instance, software code may be programmed within the trigger circuitry to enable such trigger circuitry to detect/predict such events that lead to disturbances. As one example, the trigger circuitry may monitor the operation of the chip to determine when the program counter is about to flip all of its bits from its highest value to its starting point, and may notify the clock manipulator circuitry of this "event" to enable the clock manipulator circuitry to manipulate the clock signal such that the chip can effectively cope with the resulting power disturbance.

It should be recognized that as used herein, "detecting an event" is intended to encompass predicting the event based on the detection of an operation of the integrated circuit known to trigger a disturbance within the chip. That is, some implementations may enable detection of an event prior to the event actually occurring. In this manner, detection of operations of the integrated circuit that foreshadow the actual occurrence of an event may enable early detection (prediction) of such event. Particularly regarding the above-described trigger circuitry that is capable of detecting anticipated events, such trigger circuitry may be implemented to detect operations of the integrated circuit (e.g., addresses, data sequences, instructions, control signals, etcetera) that typically lead to (or foreshadow) an event, thereby enabling the trigger circuitry to predict the occurrence of an event (thus detecting such event). By detecting an event early based on foreshadowing operations of the chip, the chip may timely respond to such event to enable the chip to cope with the event.

In another embodiment, the event detection circuitry includes a sensor for sensing a particular condition within the chip indicating an event. As one example, the event detection circuitry may include a sensor operable to detect voltage transients (e.g., beyond some threshold amount) within the chip which indicate an event. As another example, a temperature sensor may detect an event, such as the temperature being beyond the temperature range for the integrated circuit's operation, and in response to the temperature sensor detecting a temperature beyond the suitable range, the trigger circuitry may manipulate the clock in an attempt to enable the integrated circuit to cope with such event (e.g., by slowing the clock to allow the integrated circuit to cool. In this manner, the event detection circuitry may detect unanticipated events occurring within the chip's operation.

In a preferred embodiment, the chip is implemented with event detection circuitry that comprises both trigger circuitry for detecting anticipated events and sensor circuitry for detecting unanticipated events. Thus, in a preferred embodiment, if either the trigger circuitry or the sensor circuitry detect an event, then the clock manipulator circuitry may, in response thereto, adjust (or manipulate) the chip's clock signal to enable the chip to effectively cope with such event.

Accordingly, a preferred embodiment of the present invention enables both anticipated and unanticipated events to be detected, and in response, the chip's clock may be manipulated to effectively compensate for such event to prevent the chip from failing. Because the various embodiments of the present invention enable the chip's clock to be dynamically manipulated upon detection of an event, the chip may be implemented to operate very efficiently. For example, rather than implementing a sufficiently slow clock frequency to allow enough margin for the absolute worst case event that may be incurred (as is commonly done in prior art chips), a very high frequency may be implemented at which the chip's clock may operate until detection of an event, at which time the chip's clock may be manipulated (e.g., by adjusting the clock's duty cycle or adjusting the clock's frequency) to enable the chip to cope with the detected event. Therefore, the chip's performance is not sacrificed during those periods when an event is not occurring, and the chip's operation also does not fail upon the occurrence of an event. Thus, dynamically adjusting the chip's clock in accordance with detected events within the chip enable optimum performance from the chip.

DETAILED DESCRIPTION

Figure 1:
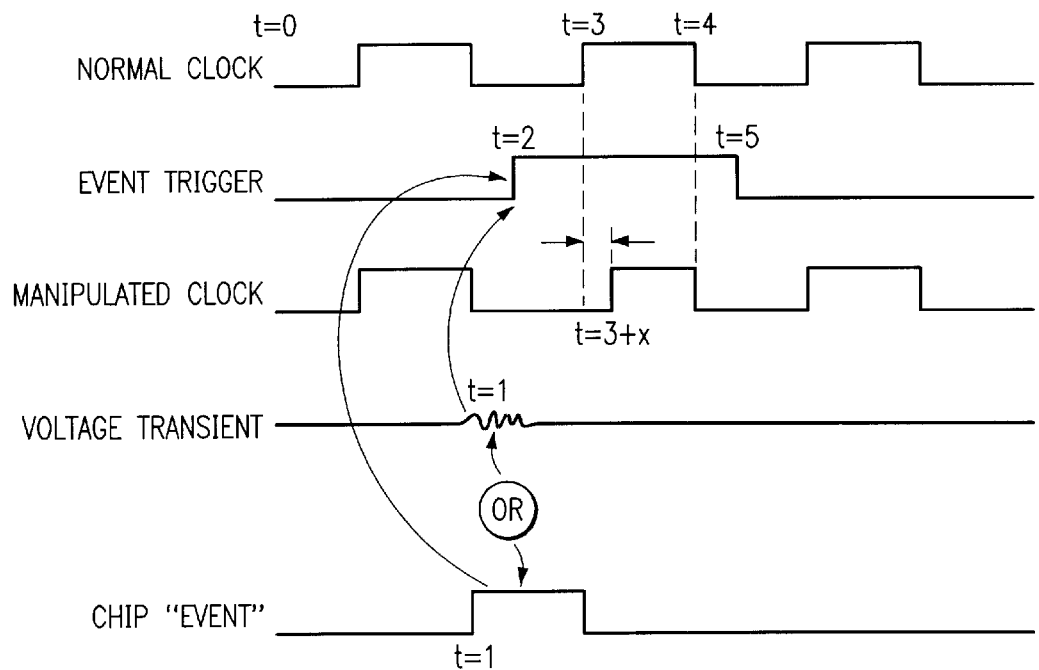
FIG. 1 shows exemplary wave forms to illustrate operational aspects of various embodiments of the present invention.
Figure 2:
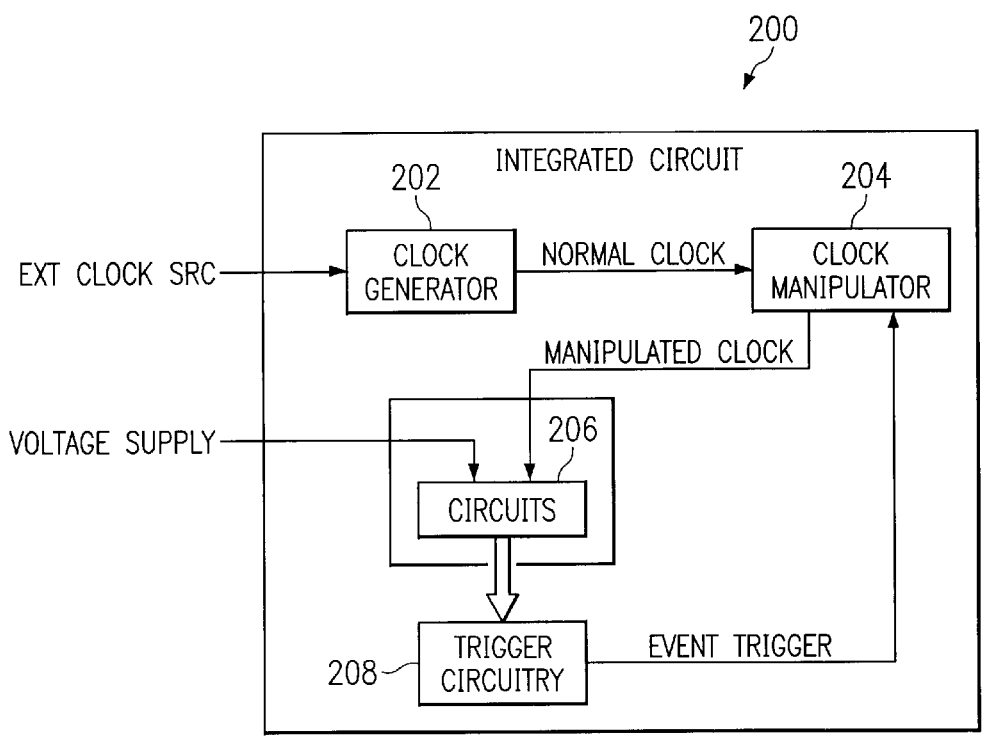
FIG. 2 shows an exemplary implementation of a chip according to a first embodiment of the present invention that enables detection/prediction of anticipated events and manipulation of the chip's clock in response thereto to allow for optimum performance of the chip.

Turning to FIG. 1, exemplary wave forms are shown to illustrate operational aspects of various embodiments of the present invention. Such exemplary wave forms will be referenced in conjunction with the following description of the embodiments of the present invention which are described in conjunction with the exemplary implementations of FIGS. 2–4, wherein like reference numerals are utilized to refer to like components. Turning now to FIG. 2, an exemplary implementation of chip 200 according to a first embodiment is shown. In the exemplary implementation of FIG. 2, an external clock signal is input to chip 200. Such external clock signal may be a clock signal generated for a system in which chip 200 is implemented, for example. The external clock signal may be any frequency, such as 200 megahertz (MHZ) for instance. In this exemplary implementation, the external clock signal is input to clock generator circuitry 202, which generates an appropriate clock signal (shown as "Normal Clock") for use within chip 200. For example, chip 200 may be capable of operating at a much greater frequency than the external clock utilized for the overall system, and clock generator 202 may therefore generate a clock signal having a much higher frequency for use within chip 200. Various suitable clock generator circuitry 202, such as Phase Locked Loop (PLL) circuitry, are well known in the art, and any such circuitry now known or later developed is intended to be within the scope of the present invention. Therefore, clock generator circuitry 202 will not be described in great detail herein. Of course, in some implementations of chip 200, the external clock signal received by chip 200 may be utilized therein, thus eliminating clock generator circuitry 202. In still other implementations of chip 200, an external clock signal may not be input thereto, but instead a clock signal may be generated within chip 200. Any such implementations are intended to be within the scope of the present invention.

In the exemplary implementation of FIG. 2, the generated Normal Clock signal is input to clock manipulator circuitry 204. As will be described in greater detail hereafter, in a preferred embodiment clock manipulator circuitry 204 is capable of manipulating the Normal Clock signal upon the detection (which includes prediction) of an event that leads to a disturbance within the chip (e.g., power disturbance), resulting in the Manipulated Clock signal, in order to optimize performance of chip 200. In a preferred embodiment, if no such event is detected, then clock manipulator 204 feeds the generated Normal Clock signal to the circuits 206 (e.g., the "core") of chip 200 which operate on such clock signal. That is, if no such event is detected, then the Manipulated Clock signal fed to circuits 206 is equal to the Normal Clock signal. In addition to the Manipulated Clock signal, the appropriate voltage from an external voltage source is input to circuits 206. It should be understood that chip 200 may be any type of integrated circuit, and circuits 206 therefore may be any suitable circuitry implemented for such chip 200. As one example, chip 200 may be a microprocessor chip. Of course, various embodiments of the present invention may be implemented in any other type of integrated circuit, and any such implementation is intended to be within the scope of the present invention.

An example of the generated Normal Clock signal is illustrated in FIG. 1. As shown, the Normal Clock signal is implemented having a normal 50 percent duty cycle, and may have any frequency suitable for chip 200. Again, the Normal Clock signal may be generated off-chip and input to chip 200 or it may be generated on-chip, and in either case such Normal Clock signal is fed through clock manipulator circuitry 204 to circuits 206. An example of the Manipulated Clock signal is also shown in FIG. 1.

In the embodiment of FIG. 2, chip 200 also includes trigger circuitry 208, which monitors the operation of chip 200 and controls clock manipulator 204. More specifically, trigger circuitry 208 monitors the operation of circuits 206 to detect operation that results in an event, which may lead to a power disturbance, for example. Upon detecting such an event, trigger circuitry 208 provides an "Event Trigger" signal to clock manipulator 204 to notify clock manipulator 204 of such detected event. As one example, trigger circuitry 208 may monitor the program counter of chip 200, and upon detecting that the program counter is resetting from its highest value back to zero (e.g., about to flip all of its bits from 1 to 0) or upon predicting that such an event is about to occur, trigger circuitry 208 may generate an Event Trigger signal to notify clock manipulator 204 of such event. In a preferred embodiment, clock manipulator 204 responds to the detected event by manipulating the Normal Clock signal in a manner to enable chip 200 to effectively cope with such event. Thus, various known events that may be detected through monitoring the chip's operation (e.g., through the monitoring of circuits 206 by trigger circuitry 208) may be programmed within trigger circuitry 208. That is, various operations of chip 200 are typically known to generate events that lead to or result in a disturbance within chip 200. Therefore, trigger circuitry 208 may be implemented to monitor chip 200 for such known (or anticipated) operations in order to detect the occurrence of the known operations, thereby enabling trigger circuitry 208 to notify clock manipulator 204 of such detected events.

Specifically, trigger circuitry 208 may monitor the operation of chip 200 for particular data (or sequences of data), commands, addresses, control signals and/or instructions, as examples, which are known to commonly trigger disturbances within the chip. For instance, software code may be programmed within trigger circuitry 208 to enable such trigger circuitry to detect such events. Exemplary implementations of such trigger circuitry 208 that may be implemented to monitor the chip's operation for particular data, addresses, control signals, and instructions, for instance, are disclosed in U.S. Pat. Nos. 5,867,644 issued to Ranson et al. on Feb. 2, 1999 and 5,880,671 issued to Ranson et al. on Mar. 9, 1999, the disclosures of which are hereby incorporated herein by reference. As an example, those patents disclose implementations of trigger circuitry for detecting particular values and conditions on various signals of chip 200. Such signals may include but are not limited to instruction patterns, address patterns, data patterns, or control signals patterns or sequences thereof. In a preferred embodiment, trigger circuitry 208 may be programmed to recognize such patterns or sequences thereof, and may generate a trigger signal upon the occurrence of such patterns or sequences either when they occur or after programmable delays, either alone or in combination with multiple signals and events. For example, trigger circuitry 208 may be programmed to recognize a particular instruction, wait 3 clocks, look for a data pattern on a bus, wait 2 clocks, look for a control signal to be a certain value, and then emit a trigger signal 6 clock cycles after these three sequential events (i.e., recognizing a particular instruction, a data pattern, and a control signal) have occurred. Of course, the trigger circuitry disclosed in such patents are intended only as examples of how trigger circuitry 208 may be implemented, and any other implementation of such trigger circuitry for monitoring the operation of chip 200 to detect the occurrence of known (or anticipated) operations that trigger events/disturbances are intended to be within the scope of the present invention.

In the example illustrated in FIG. 1, no event is detected at time t=0, resulting in the chip "Event" wave being low. That is, at time t=0 trigger circuitry 208 has not detected an event for chip 200. Accordingly, the Event Trigger signal is low, thereby indicating to clock manipulator 204 that no event has been detected by trigger circuitry 208. As a result, clock manipulator 204 passes the Normal Clock signal through to circuits 206. That is, at time t=0 the Manipulated Clock signal equals the Normal Clock signal. It should be recognized that in the example of FIG. 1, the time references provided are not in equal steps of time. For instance, the amount of time that elapses between time t=0 and time t=1 is not necessarily equal to the amount of time that elapses between time t=1 and time t=2. Instead, the times are intended only as references for identifying particular portions of the wave forms of FIG. 1, and are not intended to connote any particular timing relationship within the wave forms.

At time t=1, an event is detected by trigger circuitry 208, resulting in the chip Event signal going high. Accordingly, the Event Trigger signal output by trigger circuitry 208 transitions high at time t=2, thereby indicating to clock manipulator 204 that an event has been detected. As a result, clock manipulator 204 manipulates the Normal Clock signal to provide an adjusted Manipulated Clock signal to circuits 206 to enable chip 200 to effectively cope with the detected event. In this example, clock manipulator circuitry 204 manipulates the duty cycle of the Normal Clock in the Manipulated Clock signal. For instance, at time t=3, the Normal Clock signal having a typical 50 percent duty cycle transitions high. However, the duty cycle is adjusted for the Manipulated Clock signal such that it does not transition high until some time later, shown as time "t=3+X." For instance, "X" may equal 100 picoseconds, such that the transitioning edge of the Manipulated Clock signal is delayed for 100 picoseconds beyond that which would otherwise occur for the Normal Clock signal. It should be recognized that in a preferred embodiment "X" is variable, and may depend upon the length of time that the detected event lasts. For instance, depending on the length of time that the detected event lasts, the transitioning edge of the Manipulated Clock signal may be delayed for what would otherwise be several clock cycles of the Normal Clock signal. Thus, this embodiment enables the clock signal utilized for the circuits 206 to be dynamically manipulated to enable chip 200 to operate efficiently and account for events occurring therein.

At time t=4, both the Normal Clock and the Manipulated Clock transition low. Thus, while the Normal Clock maintains a traditional 50/50 duty cycle, clock manipulator circuitry 204 may adjust the Manipulated Clock signal to have, for example, a 60/40 duty cycle. Thus, in a preferred embodiment, clock manipulator circuitry 204 is capable of dynamically adjusting the Manipulated Clock signal to provide additional margin for the chip's circuits 206 when necessary to cope with a detected event.

At time t=5, the Event Trigger signal transitions low because the trigger circuitry 208 detects that the event has come to an end. Accordingly, clock manipulator circuitry 204 again passes the Normal Clock signal through to circuits 206. That is, at time t=5 the Manipulated Clock signal equals the Normal Clock signal. While the example of FIG. 1 illustrates an event occurring only for one clock cycle, thus resulting in the duty cycle of the Manipulated Clock signal being adjusted during that clock cycle, it should be recognized that in some instances an event may be incurred for several clock cycles, and the Manipulated Clock signal may likewise be manipulated for such several clock cycles.

In the example of FIG. 1, clock manipulator circuitry 204 adjusts the duty cycle of the Manipulated Clock signal. However, in some circumstances (or in some implementations), clock manipulator circuitry 204 may manipulate the chip's clock in other ways. For instance, in one implementation, clock manipulator circuitry 204 may cause clock generator 202 to temporarily adjust the frequency of the Normal Clock signal being utilized within chip 200, and the Manipulated Clock signal may continue to be the equivalent of the adjusted Normal Clock signal. For example, clock manipulator circuitry 204 may cause clock generator 202 (e.g., PLL circuitry) to slow the Normal Clock signal's frequency to enable chip circuits 206 to effectively cope with an event detected by trigger circuitry 208. Alternatively, clock manipulator circuitry 204 may temporarily adjust the frequency of the Manipulated Clock signal in response to a detected event by, for example, slowing the Manipulated Clock signal's frequency to enable the chip's circuits 206 to effectively cope with the event. For example, clock manipulator circuitry 204 may include an oscillator for generating a Manipulated Clock signal having a reduced frequency upon the detection of an event. Any such manipulations of the Normal Clock signal (e.g., adjusting the duty cycle and/or altering the frequency), resulting in a Manipulated Clock signal, are intended to be within the scope of the present invention.

In a preferred embodiment, clock manipulator circuitry 204 is capable of manipulating the clock signal once an event has ended to recover for the clock manipulations made during an event. For example, as shown in FIG. 1, the duty cycle of the manipulated clock has been adjusted, resulting in a shorter high phase between times t=3+X and t=4, to allow the chip to realign with the Normal Clock. However, it is possible for the manipulation to continue indefinitely, until an event has passed. If it is not acceptable to shorten one phase of the clock to allow the chip to realign with the Normal Clock, e.g., the chip may be unable to perform necessary tasks during the shortened phase, it is possible to allow the manipulation to continue until a point where such a short clock phase will not cause chip 200 to fail to operate due to the shortened phase. If no such phase shortening is acceptable, to realign to the Normal Clock at the end of the manipulation, it is possible to skip one phase of the Normal Clock to allow additional time for the Manipulated Clock to realign to the Normal Clock without resulting in a shortened phase during the recovery.

Trigger circuitry 208 of FIG. 2 may be very effective in responding to known or anticipated situations (or chip operations) that result in disturbances within the chip. That is, trigger circuitry 208 may be very effective in detecting known chip operations that commonly result in events that lead to disturbances within the chip. However, unanticipated events may be incurred within the chip. That is, events may be incurred that are not detected by monitoring known event-triggering operations of the chip. More specifically, some event-triggering operational conditions of the chip are typically unknown, and trigger circuitry 208 is therefore not implemented to detect such unknown event conditions. However, an exemplary implementation of an alternative embodiment of a chip that is capable of detecting unanticipated (or unknown) events within such chip is shown in FIG. 3.

Figure 3:
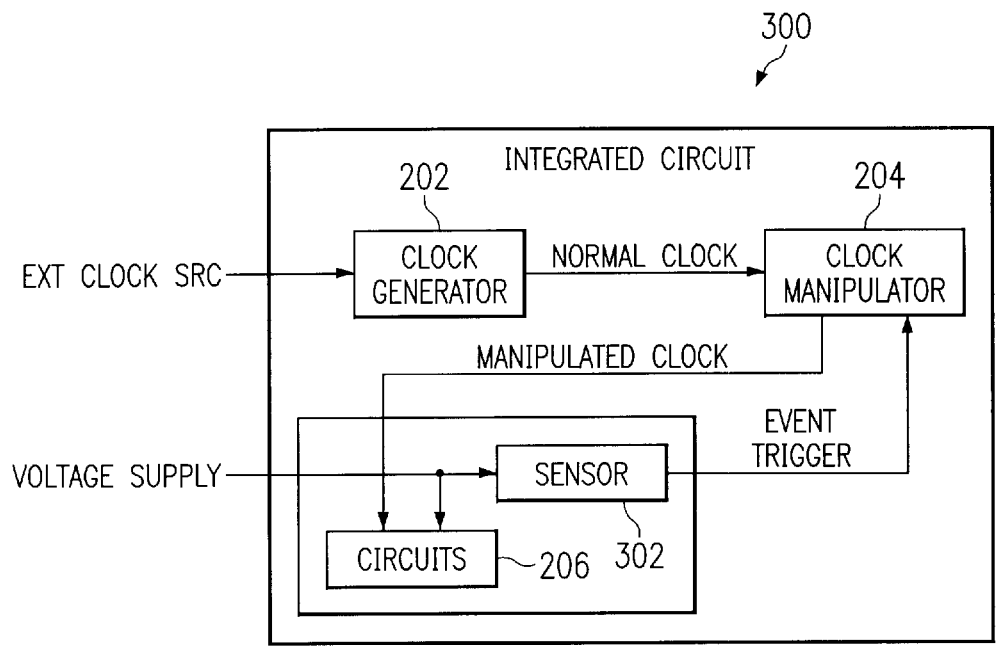
FIG. 3 shows an exemplary implementation of a chip according to a second embodiment of the present invention that enables detection of unanticipated events and manipulation of the chip's clock in response thereto to allow for optimum performance of the chip.

Turning now to FIG. 3, an exemplary implementation of chip 300 according to a second embodiment of the present invention is shown. As with the exemplary chip 200 of FIG. 2, an external clock signal is input to chip 300. Such external clock signal may be a clock signal generated for a system in which chip 300 is implemented, for example. The external clock signal may be any frequency, such as 200 megahertz (MHZ) for instance. As described above with chip 200, the external clock signal is input to clock generator circuitry 202, which generates an appropriate clock signal (shown as "Normal Clock") for use within chip 300. For example, chip 300 may be capable of operating at a much greater frequency than the external clock utilized for the overall system, and clock generator 202 may therefore generate a clock signal having a much higher frequency for use within chip 300. As described with chip 200 above, various suitable clock generator circuitry 202 (such as PLL circuitry) are well known in the art, and any such circuitry now known or later developed is intended to be within the scope of the present invention. Of course, in some implementations of chip 300, the external clock signal received by chip 300 may be utilized therein, thus eliminating clock generator circuitry 202. In still other implementations of chip 300, an external clock signal may not be input thereto, but instead a clock signal may be generated within chip 300. Any such implementations are intended to be within the scope of the present invention.

In the exemplary implementation of FIG. 3, the generated Normal Clock signal is input to clock manipulator circuitry 204, as described above with FIG. 2. As described with chip 200, in a preferred embodiment clock manipulator circuitry 204 is capable of manipulating the Normal Clock signal upon the detection of an event, resulting in the Manipulated Clock signal, in order to optimize performance of chip 300. In a preferred embodiment, if no such event is detected, then clock manipulator 204 feeds the generated Normal Clock signal to the circuits 206 of chip 300 which operate on such clock signal. That is, if no such event is detected, then the Manipulated Clock signal fed to circuits 206 is equal to the Normal Clock signal. In addition to the Manipulated Clock signal, the appropriate voltage from an external voltage source is input to the circuits 206. As with chip 200 of FIG. 2, it should be understood that chip 300 may be any type of integrated circuit, and circuits 206 therefore may be any suitable circuitry implemented for such chip 300. As one example, chip 300 may be a microprocessor chip. Of course, various embodiments of the present invention may be implemented in any other type of integrated circuit, and any such implementation is intended to be within the scope of the present invention.

An example of the generated Normal Clock signal is illustrated in FIG. 1. As shown, the Normal Clock signal is implemented having a normal 50 percent duty cycle, and may have any frequency suitable for chip 300. Again, the Normal Clock signal may be generated off-chip and input to chip 300 or it may be generated on-chip, and in either case such Normal Clock signal is fed through clock manipulator circuitry 204 to circuits 206. An example of the Manipulated Clock signal is also shown in FIG. 1.

In the embodiment of FIG. 3, chip 300 also includes sensor 302, which monitors the operation of circuits 206 and detects disturbances, such as voltage transients, within chip 300 to control clock manipulator 204. More specifically, the external voltage supply is input to the circuits 206 to enable circuits 206 to draw from such voltage supply. Sensor circuitry 302 monitors the voltage to circuits 206 to detect the occurrence of voltage transients. For instance, sensor circuitry 302 may monitor the voltage and signal the clock manipulator 204 if the voltage drops outside of a predetermined threshold. That is, sensor circuitry 302 can be implemented to detect the occurrence of events by monitoring the voltage provided to the circuits 206. Upon detecting a voltage transient, sensor 302 provides an "Event Trigger" signal to clock manipulator 204 to notify clock manipulator 204 of a detected event.

In a preferred embodiment, clock manipulator 204 responds to the detected event by manipulating the Normal Clock signal (resulting in the Manipulated Clock signal) in a manner to enable chip 300 to effectively cope with such event. Thus, various events that may not be anticipated (e.g., and therefore cannot be effectively detected by trigger circuitry 208 of FIG. 2) may be detected by sensor 302 detecting voltage transients within chip 300. Therefore, sensor 302 may be implemented within chip 300 to detect events that may or may not be anticipated (or known) to occur within the operation of chip 300, thereby enabling sensor 302 to notify clock manipulator 204 of such detected events.

In the example illustrated in FIG. 1, no event is occurring within chip 300 at time t=0, resulting in a relatively flat (or constant) voltage transient wave form. That is, at time t=0 the voltage provided to circuits 206 is relatively constant (i.e., no voltage transient is occurring), and therefore at time t=0 sensor circuitry 302 does not detect a voltage transient for chip 300. Accordingly, the Event Trigger signal output by sensor circuitry 302 is low, thereby indicating to clock manipulator 204 that no event has been detected by sensor circuitry 302. As a result, clock manipulator 204 passes the Normal Clock signal through to circuits 206. That is, at time t=0 the Manipulated Clock signal equals the Normal Clock signal.

At time t=1, a voltage transient occurs, and is detected by sensor 302. Accordingly, the Event Trigger signal output by sensor 302 transitions high at time t=2, thereby indicating to clock manipulator 204 that an event has been detected. As a result, clock manipulator 204 manipulates the Normal Clock signal to provide an adjusted Manipulated Clock signal to circuits 206 to enable chip 300 to effectively cope with the detected event. In this example, clock manipulator circuitry 204 manipulates the duty cycle of the Normal Clock in the Manipulated Clock signal. For instance, at time t=3, the Normal Clock signal having a typical 50 percent duty cycle transitions high. However, the duty cycle is adjusted for the Manipulated Clock signal such that it does not transition high until some time later, shown as time "t=3+X." For instance, "X" may equal 100 picoseconds, such that the transitioning edge of the Manipulated Clock signal is delayed for 100 picoseconds beyond that which would otherwise occur for the Normal Clock signal. As described above, in a preferred embodiment, "X" is variable and may depend upon the length of time that the detected event lasts. For instance, depending on the length of time that the detected event lasts, the transitioning edge of the Manipulated Clock signal may be delayed for what would otherwise be several clock cycles of the Normal Clock signal. Thus, this embodiment enables the clock signal utilized for the circuits 206 to be dynamically manipulated to enable chip 300 to operate efficiently and account for events occurring therein.

At time t=4, both the Normal Clock and the Manipulated Clock transition low. Thus, while the Normal Clock maintains a traditional 50/50 duty cycle, clock manipulator circuitry 204 may adjust the Manipulated Clock signal to have, for example, a 60/40 duty cycle. Thus, in a preferred embodiment, clock manipulator circuitry 204 is capable of dynamically adjusting the Manipulated Clock signal to provide additional margin for the chip's circuits 206 when necessary to cope with an event detected by sensor 302.

At time t=5, the Event Trigger signal transitions low because the sensor circuitry 302 detects that the voltage transient is no longer present. Accordingly, clock manipulator circuitry 204 again passes the Normal Clock signal through to circuits 206. That is, at time t=5 the Manipulated Clock signal equals the Normal Clock signal. As discussed above, while the example of FIG. 1 illustrates an event occurring only for one clock cycle, thus resulting in the duty cycle of the Manipulated Clock signal being adjusted during that clock cycle, it should be recognized that in some instances an event (e.g., as indicated by a voltage transient detected by sensor 302) may be incurred for several clock cycles, and the Manipulated Clock signal may likewise be manipulated for such several clock cycles.

In the example of FIG. 1, clock manipulator circuitry 204 adjusts the duty cycle of the Manipulated Clock signal. However, in some circumstances (or in some implementations), clock manipulator circuitry 204 may manipulate the chip's clock in other ways. For instance, in one implementation, clock manipulator circuitry 204 may cause clock generator 202 to temporarily adjust the frequency of the Normal Clock signal being utilized within chip 300, and the Manipulated Clock signal may continue to be the equivalent of the adjusted Normal Clock signal. For example, clock manipulator circuitry 204 may cause clock generator 202 to slow the Normal Clock signal's frequency to enable chip circuits 206 to effectively cope with an event detected by sensor circuitry 302. Alternatively, clock manipulator circuitry 204 may temporarily adjust the frequency of the Manipulated Clock signal in response to a detected event by, for example, slowing the Manipulated Clock signal's frequency to enable the chip's circuits 206 to effectively cope with the event. Any such manipulations of the Normal Clock signal (e.g., adjusting the duty cycle and/or altering the frequency), resulting in a Manipulated Clock signal, are intended to be within the scope of the present invention.

It should be recognized that while sensor 302 has been described herein as being a voltage sensor for detecting voltage transients within chip 300, various other sensors 302 may be implemented to enable detection of other behaviors of chip 300 which may be indicative of an event/disturbance within the chip. As one example, a temperature sensor may be utilized in a manner similar to the above-described voltage sensor in order to manipulate the clock signal in incidences of temperature excursions beyond the specification of the chip in order to, for instance, slow the clock down to allow the chip to cool.

Figure 4:
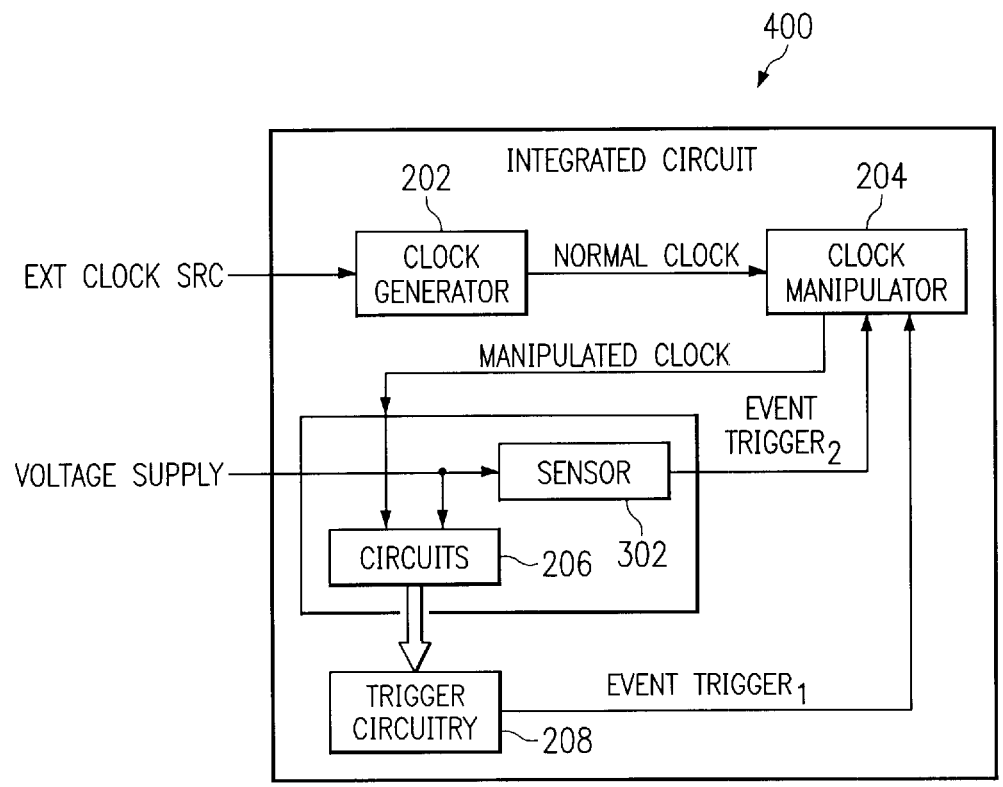
FIG. 4 shows an exemplary implementation of a chip according to a most preferred embodiment of the present invention that enables detection of both anticipated and unanticipated events and manipulation of the chip's clock in response thereto to allow for optimum performance of the chip.

Turning now to FIG. 4, an exemplary implementation of a preferred embodiment is shown. FIG. 4 provides chip 400, which includes trigger circuitry 208 and sensor circuitry 302 that function as described above in conjunction with FIGS. 2 and 3, respectively. Thus, in a preferred embodiment, anticipated operations of chip 400 known to trigger events may be detected by trigger circuitry 208, and unanticipated events may be detected by sensor 302. More specifically, trigger circuitry 208 outputs Event Trigger$_1$ signal to clock manipulator circuitry 204, and sensor circuitry 302 outputs Event Trigger$_2$ signal to clock manipulator circuitry 204. If either Event Trigger$_1$ or Event Trigger$_2$ indicate that an event has been detected, then clock manipulator 204 may adjust (or manipulate) the Manipulated Clock signal to enable chip 400 to effectively cope with such event in the manner(s) disclosed above.

Figure 5:
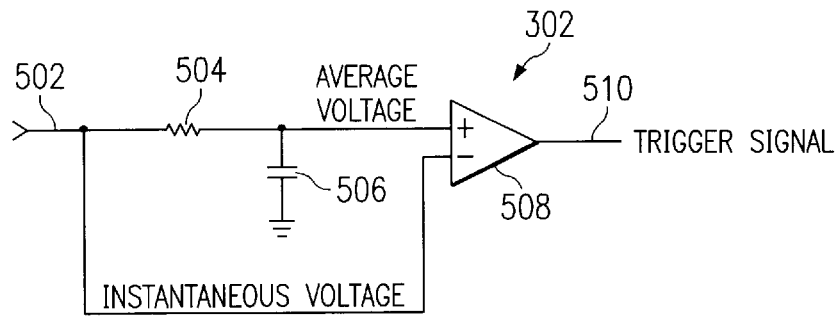
FIG. 5 shows an exemplary implementation of a voltage sensor that may be implemented within various embodiments for detecting voltage transients within the chip.

Turning to FIG. 5, one example of an implementation of circuitry for sensor 302 is shown. Of course, various other implementations of such sensor may be utilized in various embodiments, and any such implementations are intended to be within the scope of the present invention. In the example of FIG. 5, sensor 302 monitors a voltage signal 502, which may be, for instance, one of the chip's internal power supply lines. Included in sensor 302 is resistor 504 and capacitor 506, which form a passive low pass filter that serves to effectively "average" the local power supply voltage and remove sudden transients (which is what sensor 302 is trying to detect). This average voltage signal is presented as a reference voltage differential amplifier 508. An alternative implementation might use an active low pass filter to provide a more stable reference voltage than a passive filter, and those skilled in the art will recognize how to implement such an active filter.

Differential amplifier 508 compares the reference voltage (i.e., average voltage) to the instantaneous voltage (i.e., the actual voltage 502). If a sudden transient on voltage 502 drops below the time-averaged value from the low pass filter, a trigger signal 510 is generated by differential amplifier 508 to indicate that the voltage being monitored has dropped below the "average" value. This exemplary implementation allows voltage sensor 302 to detect transient voltage disturbances that occur on a cycle to cycle basis, but also allows it to reject longer term changes in the voltage level that occur as the voltage ramps up during power up or as long-term conditions change the internal voltage on the chip, as examples.

Figure 6:
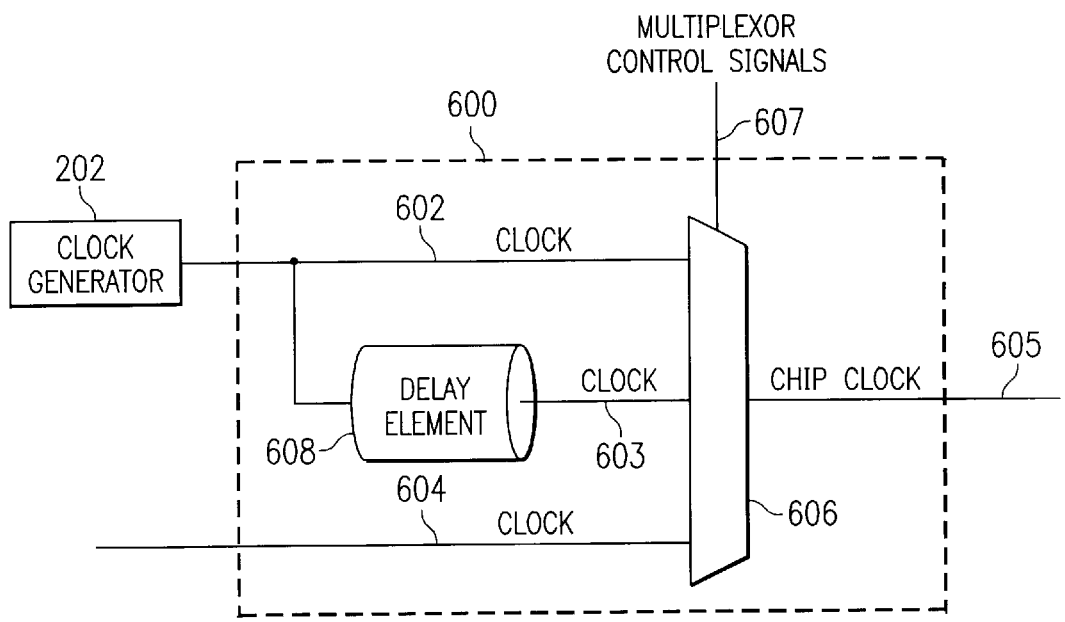
FIG. 6 shows a canonical implementation of clock manipulator circuitry that may be implemented in embodiments of the present invention for manipulating a chip's clock.

FIG. 6 shows a canonical implementation of clock manipulator circuitry 600 that may be implemented for clock manipulator circuit 204 in various embodiments of the present invention. In this example, chip clock 605 (i.e., the Manipulated Clock signal of FIGS. 1–4) is derived from one of three sources. More specifically, sources 602, 603, and 604 are input to multiplexor 606, which based on control signal(s) 607, outputs one of such sources as chip clock 605. Source 602 is the "normal" clock signal generated by clock generator 202 (e.g., a PLL), as described above. As further described above, any number of means could be used to generate this normal clock, including direct input to multiplexor 606 from an external source. In order to implement the phase stretching capability, the output of clock generator 202 is run through a controlled delay element 608. Delay element 608 could be any suitable combination of circuits and wires operable to controllably delay the transition of the clock signal output by clock generator 202. Alternatively, delay element 608 may be implemented as a delay locked loop (DLL) which can generate a delay that is a fixed fraction of the cycle time of normal clock 602. In addition, one or more external clock inputs 604 can be provided to multiplexor 606 to enable alternate clocks of differing frequency and/or phase to be chosen.

Multiplexor 606 passes one of the source clock signals 602, 603, 604 through to chip clock 605 based on the value of control signal(s) 607, which are generated directly or indirectly by trigger circuitry 208. For example, if an event requiring a longer phase is detected by trigger circuitry 208, control signal(s) 607 can be changed to select delayed clock 603, which will then be presented to chip circuits 206 as clock 605. It should be understood that care should be taken in the generation of control signal(s) 607 to avoid glitching or other undesirable behavior when transitioning from one source clock input to another by multiplexor 606. It should also be understood that clock manipulator circuitry 600 is intended only as an example of clock manipulator circuitry that may be implemented in various embodiments of the present invention, and any other suitable implementation of clock manipulator circuitry now known or later discovered that is operable to manipulate a chip's clock signal responsive to detected/anticipated events is intended to be within the scope of the present invention.

As described above, a preferred embodiment of the present invention enables for both anticipated and unanticipated events to be detected, and in response the chip's clock may be manipulated to effectively compensate for such event to prevent the chip from failing. Because the various embodiments of the present invention enable the chip's clock to be dynamically manipulated upon detection of an event, the chip may be implemented to operate very efficiently. For example, rather than implementing a sufficiently slow clock frequency to allow enough margin for the absolute worst case event that may be incurred (as is commonly done in prior art chips), a very high frequency may be implemented at which the chip's clock may operate until an event being detected, at which time the chip's clock may be manipulated (e.g., by adjusting the clock's duty cycle or adjusting the clock's frequency) to enable the chip to cope with the detected event. Therefore, the chip's performance is not sacrificed during those periods when an event is not occurring, while the chip's operation also does not fail upon the occurrence of an event. Thus, dynamically adjusting the chip's clock in accordance with detected events within the chip enable optimum performance from the chip.

While the above exemplary implementations shown in FIGS. 2–4 provide a common clock generator circuitry and clock manipulator that is utilized to generate a clock signal that is used throughout the chip, it should be understood that a plurality of clock generators and/or clock manipulators may be distributed throughout the chip to each generate separate clock signals used for certain portions (i.e., certain circuitry) of the chip. Thus, it should be recognized that clock generation/manipulation may be distributed across the chip, rather than just arranged in one central location on the chip. For example, many clock generators/manipulators may exist within a chip, each of which may have localized (or dedicated) voltage sensors or trigger circuitry, and manipulation of their respective clock signals may occur local thereto as opposed to performing clock manipulation that is utilized globally throughout the entire chip.

What is claimed is:

1. A method of providing dynamic clock signaling within an integrated circuit to enable optimum performance of the integrated circuit while accounting for events within the integrated circuit's operation, said method comprising:
   inputting a clock signal to the appropriate circuitry of the integrated circuit;
   monitoring the integrated circuit's operation;
   detecting an event within the integrated circuit's operation, wherein said detecting an event includes detecting an operation of the integrated circuit known to trigger the event; and
   manipulating the clock signal to enable the integrated circuit to cope with the detected event without failing.

2. The method of claim 1 wherein said manipulating includes:
   altering the duty cycle of the clock signal.

3. The method of claim 1 wherein said manipulating includes:
   delaying the occurrence of a transition of the clock signal.

4. The method of claim 1 wherein said manipulating includes:
   altering the frequency of the clock signal.

5. The method of claim 1 further comprising:
   detecting the end of the detected event; and
   manipulating the clock signal to enable optimum performance of the integrated circuit.

6. The method of claim 1 wherein said detecting an event includes:
   detecting a voltage transient within the integrated circuit.

7. The method of claim 1 wherein said monitoring, detecting, and manipulating steps are performed by components integrated within the integrated circuit.

8. A method of providing dynamic clock signaling within an integrated circuit to enable optimum performance of the integrated circuit while accounting for events within the integrated circuit's operation, said method comprising:
   inputting a clock signal to the appropriate circuitry of the integrated circuit;
   monitoring the integrated circuit's operation;
   predicting an event within the integrated circuit's operation based on the detection of an operation of the integrated circuit known to trigger the event; and
   manipulating the clock signal to enable the integrated circuit to cope with the predicted event without failing.

9. An integrated circuit having dynamic clock signaling, said integrated circuit comprising:
   synchronous circuitry that receives and operates according to a clock signal;
   event detection circuitry arranged to monitor the circuitry's operation and detect an event therein, wherein said event detection circuitry includes trigger circuitry operable to detect a known operation of the synchronous circuitry known to trigger the event; and
   clock manipulator circuitry to manipulate the clock signal, responsive to said event detection circuitry detecting an event, to enable the synchronous circuitry to cope with the detected event without failing.

10. The integrated circuit of claim 9 wherein said clock manipulator circuitry is operable to manipulate the clock signal in at least one of the following manners: altering the duty cycle of the clock signal, delaying the occurrence of a transition of the clock signal, and altering the frequency of the clock signal.

11. The integrated circuit of claim 9 wherein said event detection circuitry is further arranged to detect the end of the detected event, and wherein said clock manipulator circuitry is operable to manipulate the clock signal to the optimum clock signal for normal operation of the synchronous circuitry responsive to said event detection circuitry detecting the end of the detected event.

12. The integrated circuit of claim 9 wherein said event detection circuitry includes a sensor for sensing a particular condition within said integrated circuit indicating the event.

13. The integrated circuit of claim 12 wherein said sensor is operable to detect voltage transients within said integrated circuit which indicate the event.

14. An integrated circuit having dynamic clock signaling, said integrated circuit comprising:
   synchronous circuitry that receives and operates according to a clock signal;
   event detection circuitry arranged to monitor the circuitry's operation and detect an event therein, wherein said event detection circuitry includes trigger circuitry operable to detect a known operation of the synchronous circuitry known to trigger the event, and wherein said known operation includes one or more of the following: known address, known data sequence, known control signals, and known instruction; and
   clock manipulator circuitry to manipulate the clock signal, responsive to said event detection circuitry detecting an event, to enable the synchronous circuitry to cope with the detected event without failing.

15. A system comprising:
   at least one integrated circuit that includes
      synchronous circuitry that receives and operates according to a clock signal,
      event detection means for detecting an event within the integrated circuit, wherein said event detection means includes means for detecting a known operation of the synchronous circuitry known to trigger the event, and
      clock manipulator means for manipulating the clock signal responsive to said event detection means detecting an event within the integrated circuit to enable the synchronous circuitry to cope with the detected event without failing.

16. The system of claim 15 wherein said clock manipulator means is operable to manipulate the clock signal in at least one of the following manners: altering the duty cycle of the clock signal, delaying the occurrence of a transition of the clock signal, and altering the frequency of the clock signal.

17. The system of claim 15 wherein said event detection means includes means for sensing a particular condition within said integrated circuit indicating the event.

18. A method comprising:
   inputting a clock signal to the appropriate circuitry of the integrated circuit;

monitoring the integrated circuit's operation;

detecting an operation of the integrated circuit that triggers an anticipated event within the integrated circuit's operation;

sensing an unanticipated event within the integrated circuit's operation; and responsive to either said detecting an operation that triggers said anticipated event or sensing an unanticipated event, manipulating the clock signal to enable the integrated circuit to cope with the anticipated event or unanticipated event without failing.

19. The method of claim 18 wherein said operation that triggers said anticipated event includes access of one or more of the following: known address, known data sequence, known control signals, and known instruction.

20. The method of claim 18 wherein said sensing comprises sensing at least one selected from the group consisting of: a voltage transient and a temperature of said integrated circuit that is above a threshold.

21. A system comprising:

a detector for detecting an anticipated operation in an integrated circuit that is known to trigger a voltage transient in said integrated circuit;

a sensor for sensing an unanticipated voltage transient in the integrated circuit; and a clock manipulator for manipulating a clock signal of the integrated circuit responsive to said detector detecting said anticipated operation or said sensor sensing said unanticipated voltage transient to enable the integrated circuit to cope with the voltage transient without failing.

22. The system of claim 21 wherein said detector for detecting an anticipated operation is operable to detect access by said integrated circuit of at least one of the following: known address, known data sequence, known control signals, and known instruction.

23. The system of claim 21 wherein said sensor for sensing an unanticipated voltage transient comprises at least one selected from the group consisting of:

a voltage sensor for sensing a voltage transient in said integrated circuit, and a temperature sensor for sensing the temperature of said integrated circuit.

* * * * *